United States Patent
Ateca

(10) Patent No.: US 7,338,247 B2
(45) Date of Patent: Mar. 4, 2008

(54) QUICK RELEASE FASTENER

(76) Inventor: Steven J. Ateca, P.O. Box 1654, Oak Park, IL (US) 60304

( * ) Notice: Subject to any disclaimer, the term of this patent is extended or adjusted under 35 U.S.C. 154(b) by 0 days.

(21) Appl. No.: 11/062,679

(22) Filed: Feb. 22, 2005

(65) Prior Publication Data

US 2005/0207863 A1    Sep. 22, 2005

Related U.S. Application Data

(60) Provisional application No. 60/553,376, filed on Mar. 16, 2004.

(51) Int. Cl.
  *F16B 37/08* (2006.01)
  *F16B 37/16* (2006.01)
  *F16B 43/02* (2006.01)
  *F16B 39/04* (2006.01)
  *F16B 39/284* (2006.01)

(52) U.S. Cl. .................. 411/433; 411/437; 411/540; 411/294; 411/324

(58) Field of Classification Search ............ 411/296, 411/300, 294, 295, 324, 305, 292, 293, 326, 411/327, 328, 329, 433, 437, 540; 248/200.1
See application file for complete search history.

(56) References Cited

U.S. PATENT DOCUMENTS

| | | | | |
|---|---|---|---|---|
| 738,008 A * | 9/1903 | Decker | ............ | 411/296 |
| 785,528 A * | 3/1905 | Thompson | ............ | 411/329 |
| 787,804 A * | 4/1905 | Thompson | ............ | 411/300 |
| 878,042 A * | 2/1908 | Chesterman | ............ | 70/230 |
| 920,055 A * | 4/1909 | Hauck | ............ | 411/211 |
| 926,867 A * | 7/1909 | Holloway | ............ | 411/300 |
| 1,021,110 A * | 3/1912 | Niewohner | ............ | 411/244 |
| 1,047,691 A * | 12/1912 | Olsen et al. | ............ | 411/300 |
| 1,048,124 A * | 12/1912 | Hunter | ............ | 411/296 |
| 1,151,124 A * | 8/1915 | Pohlman | ............ | 411/300 |
| 1,183,966 A * | 5/1916 | Flake | ............ | 411/296 |
| 1,195,468 A * | 8/1916 | Hervert | ............ | 411/296 |
| 1,202,096 A * | 10/1916 | Poling | ............ | 411/296 |
| 1,366,232 A * | 1/1921 | Wisdom | ............ | 411/296 |
| 1,370,897 A * | 3/1921 | Mancini | ............ | 411/207 |
| 1,504,189 A * | 8/1924 | Rees | ............ | 411/328 |
| 1,611,628 A * | 12/1926 | Andersen | ............ | 411/210 |
| 2,593,534 A | 4/1952 | Campanelli | | |
| 3,063,063 A | 11/1962 | Brooks | | |
| 3,613,130 A | 10/1971 | Sansone | | |
| 3,802,000 A | 4/1974 | Waldon | | |
| 4,159,548 A | 7/1979 | Hewson | | |
| 4,319,365 A | 3/1982 | Bemis et al. | | |
| 4,326,307 A | 4/1982 | Baillie et al. | | |
| 4,765,277 A * | 8/1988 | Bailey et al. | ............ | 119/57.9 |
| 4,965,889 A | 10/1990 | Tissot et al. | | |
| 5,175,891 A | 1/1993 | Ohshima et al. | | |
| 5,267,357 A | 12/1993 | Ades | | |
| 5,359,461 A * | 10/1994 | Rice et al. | ............ | 359/874 |

(Continued)

*Primary Examiner*—David C Reese
(74) *Attorney, Agent, or Firm*—Beem Patent Law Firm

(57) ABSTRACT

A releasable fastener for releasably engaging a bolt body has a generally cylindrical sleeve member having an inner surface closely spaced from an outer surface of the bolt body. A latch member having a contact surface is mounted on the sleeve member for movement between a first position wherein the contact surface is in engagement with the bolt body and a second position wherein the contact surface is not in engagement with the bolt body.

11 Claims, 2 Drawing Sheets

U.S. PATENT DOCUMENTS

| | | |
|---|---|---|
| 5,396,663 A | 3/1995 | Burgess |
| 5,414,875 A | 5/1995 | Kappl et al. |
| 5,457,824 A | 10/1995 | Reed |
| 5,638,554 A | 6/1997 | Corzine |
| 5,933,875 A | 8/1999 | Hulsebus et al. |
| 6,070,295 A | 6/2000 | Hulsebus |
| 6,071,034 A | 6/2000 | Cavagna |
| 6,101,640 A | 8/2000 | Brewer et al. |
| 6,338,167 B1 | 1/2002 | Baker et al. |
| 6,381,762 B1 | 5/2002 | Moser |
| 6,453,478 B1 | 9/2002 | Semmler |
| 6,514,027 B1 * | 2/2003 | Yiu et al. .................... 411/433 |
| 6,962,470 B2 * | 11/2005 | Anscher ..................... 411/433 |
| 2001/0013143 A1 | 8/2001 | Cavagna |
| 2003/0182719 A1 | 10/2003 | Glesson |

* cited by examiner

QUICK RELEASE FASTENER

CROSS REFERENCE TO RELATED APPLICATIONS

This application claims the benefit of provisional patent Application Ser. No. 60/553,376 filed Mar. 16, 2004.

BACKGROUND

1. Field of the Invention

This invention is directed generally to the field of fasteners and more particularly to a novel and improved quick release type fastener. The fastener of the invention is designed for easy engagement with and release from the body of a bolt or similar member having an elongated body such as a pin, rod or the like. In one particularly useful application, the fastener of the invention may be employed as a quick release system for allowing simplified installation and removal of the seat of a toilet for purposes of replacement of the same or for cleaning purposes. However, the invention is not limited to this application.

2. Description of the Related Art

Typically, a toilet seat is provided with a pair of projecting threaded bolts, which extend through a bore formed in a toilet bowl and each is engaged by internally threaded nut, which bears against the opposite side of the bowl. The nut may directly engage the undersurface of the bowl about the through opening through which the bolt extends, or a separate washer may be provided for this purpose. Generally speaking, installation and removal requires the use of one or more tools and the threading and tightening of the nuts upon the bolts so as to grippingly engage with the toilet bowl.

A number of modified fastener arrangements have heretofor been proposed for this purpose, and in this regard, U.S. Pat. Nos. 2,593,534 and 4,326,307 illustrate examples of such prior art arrangements. The '534 patent discloses a split sleeve which clamps around the threaded bolt. The sleeve is compressible and releasable in response to the action of a latch member which bears against an outer surface of the sleeve. The '307 patent concerns a release mechanism which acts upon the head of the bolt, while a conventional nut is used on the threaded body of the bolt.

Another arrangement is shown in U.S. Pat. No. 5,175,891 which is directed primarily to a spring-loaded lid mechanism and shows a conventional protruding bolt for attachment purposes. U.S. Pat. No. 5,638,554 shows a hook-like arrangement which bears against the undersurface of the fixture, and which is spring-loaded.

U.S. Pat. No. 3,063,063 shows a relatively complex arrangement of parts, including a sleeve which threads over the threaded bolt, and a release mechanism which uses a locking ball to engage and disengage a groove on the lower portion of the sleeve. A similar arrangement is shown in published application 2003/0182,719 in which the mechanism is essentially reversed in that a "plug shaft" is provided with a number of knobs sized for a friction fit within a sleeve-like "plug receptacle."

U.S. Pat. No. 5,396,663 provides an eccentric spindle which engages and disengages a sleeve as it is rotated. U.S. Pat. No. 6,453,478 shows a specially formed pin, which is held by a releasable "spring ring."

OBJECTS AND SUMMARY OF THE INVENTION

Briefly, in accordance with the foregoing, it is a general object of the invention to provide a novel and improved quick release fastener, which represents an improvement on the above-discussed arrangements.

Briefly, a quick release fastener for releasably engaging a bolt body, in accordance with the invention comprises a generally cylindrical sleeve member surrounding said bolt body, said sleeve member having an inner surface closely spaced from an outer surface of said bolt body, and a cam member having a contact surface, said latch member being mounted on said sleeve member for movement between a first position wherein said contact surface is in engagement with said bolt body and a second position wherein said contact surface is not in engagement with said bolt body.

DETAILED DESCRIPTION OF THE ILLUSTRATED EMBODIMENT

Figure 1:
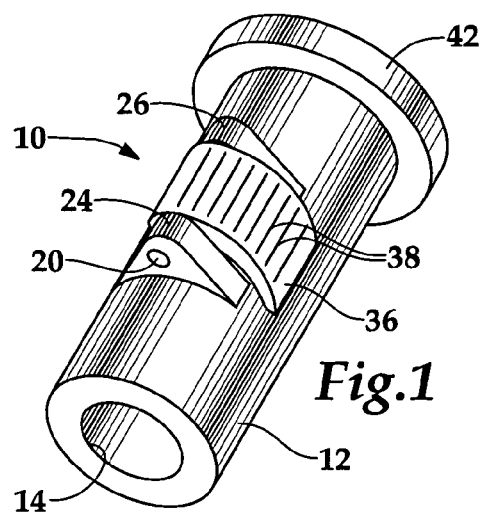
FIG. 1 is a perspective view illustrating a quick release fastener in accordance with one embodiment of the invention.
Figure 3:
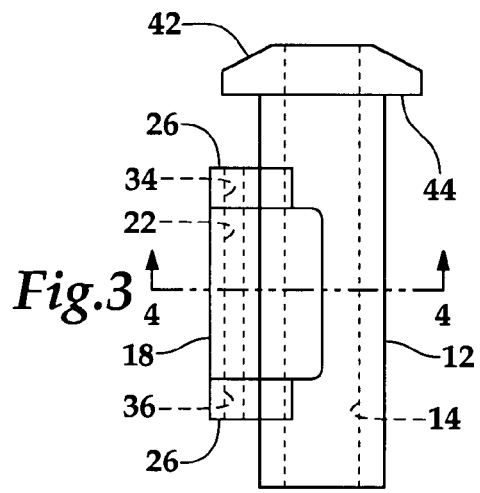
FIG. 3 is a side elevation rotated approximately 90° from the elevation of FIG. 2.
Figure 4:
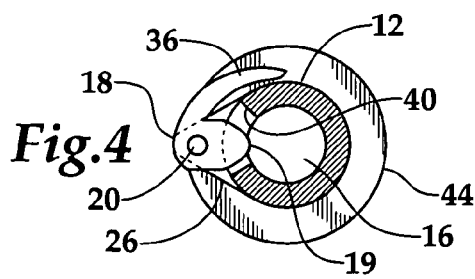
FIG. 4 is an end view showing a latch member in a first position.
Figure 5:
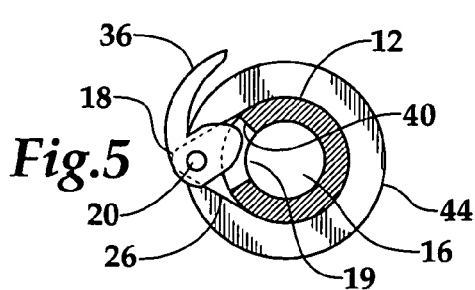
FIG. 5 is an end view similar to show FIG. 4, showing the latch member in a second position.

Referring now to the drawings, and initially to FIG. 1, there is shown a quick release fastener 10 in accordance with the invention. The fastener 10 has a generally cylindrical body or sleeve member or portion 12, which has a hollow interior defined by an inner surface or wall 14. The interior is sized for closely surroundingly engaging a threaded fastener 16, or similar cylindrical object, in such a fashion that the sleeve may be readily slidably engaged and disengaged with the fastener. A quick release latch or cam member 18 is mounted to the sleeve 12 for movement between a first position, as shown in FIG. 4, wherein a contact or bearing surface of 19 of the cam member 18 is in frictional engagement with the outer surface or body of the bolt 16, and a second position, as shown in FIG. 5, where the bearing or contact surface 19 of the cam member 18 is out of engagement with the bolt 16.

In operation, when the contact surface 19 is pressed into engagement with the bolt 16, the diametrically opposed surface of the sleeve 12 will be drawn inwardly into contact with the opposite surface of the bolt 16. This will further facilitate a locking engagement of the fastener 10 of the invention with the bolt 16. It will be appreciated that appropriate manipulation of the latch or cam member 18 will result in the desired pressing of the contact surface 19 against the bolt to achieve this locking engagement.

In the illustrated embodiment, a hinge or pivot arrangement including a pivot pin 20 extending through a set of aligned bores 32, 34 and 22 in the cam member and sleeve, respectively, mounts the cam member for pivotal movement between the two above-described positions. The through bores, 32 and 34, are formed in respective protruding portions 24 and 26 of the sleeve 12, which are spaced to either side of the cam member 18. The cam member 18 also has an outwardly extending gripping surface 36, which may be formed with knurls or other grip facilitating features 38.

Figure 2:
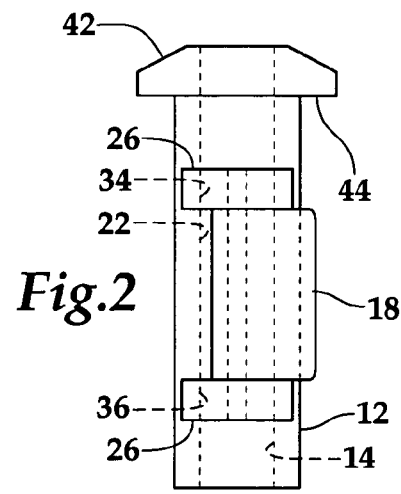
FIG. 2 is a side elevation of the fastener of FIG. 1.

The pivot pin 20 may have enlarged end portions as shown in FIG. 2, or may otherwise be formed so as to non-rotatably engage with the bores 32 and 34 and rotatably engage with the bore 22 of the cam member 18. Other arrangements may also be used for pivotally mounting the cam member for the above-described movement with respect to the sleeve 12, without departing from the invention.

In order to permit the engagement of the surface 19 of the cam member with the fastener 16, a through opening 40 is provided in an appropriate portion of the sleeve 12. This opening 40 is such that the surface 19 of the latch member may extend through the sleeve 12 for engagement with the bolt 16 as shown in FIG. 4, for example.

In the illustrated embodiment an additional bearing surface 42 is provided, for example by an enlarged or increased diameter rim portion 44 on one end of the sleeve 12. This enlarged diameter bearing surface 42 may bear against an undersurface of the toilet bowl or other fixture from which the nut 16 projects, in order to securely engage the same, when the cam 18 is in secure locking engagement with the bolt 16.

Referring now to FIGS. 6-12, there is shown a second embodiment of a quick release fastener in accordance with the invention. In this embodiment, various parts and components are designated by the same reference numerals used above to designate like-functioning parts and components, with the prefix 1. Hence, the fastener in FIGS. 6-12 is labeled 110.

Figure 6:
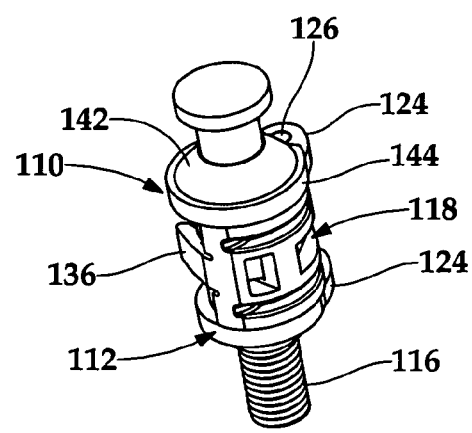
FIG. 6 is a top perspective view illustrating a quick release fastener in accordance with another embodiment of the invention.
Figure 7:
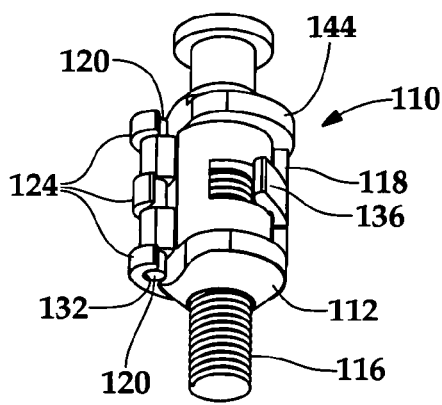
FIG. 7 is a bottom perspective view of the fastener of FIG. 6, rotated approximately 90°.

The fastener 110 has a generally cylindrical body or sleeve member or portion 112, which has a hollow interior defined by an inner surface or wall 114. The interior is sized for closely surroundingly engaging a threaded fastener 116, or similar cylindrical object, in such a fashion that the sleeve may be readily slidably engaged and disengaged with the fastener. A quick release latch or cam member 118 is mounted to the sleeve 112 for movement between a first position, as shown in FIGS. 6 and 7, wherein contact or bearing surfaces 119 of the latch member 118 are in engagement with the bolt 116, and a second position shown in FIG. 8, where the bearing or contact surfaces 119 of the latch member 118 are out of engagement with the bolt 116.

Figure 8:
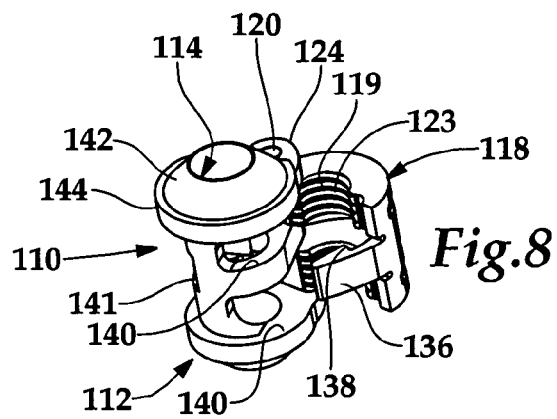
FIG. 8 is a top perspective view of the fastener of FIG. 6, in an open position.
Figure 9:
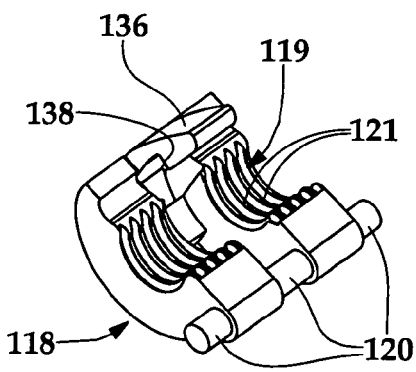
FIG. 9 is a perspective view of a latch member of the fastener of FIG. 6.
Figure 10:
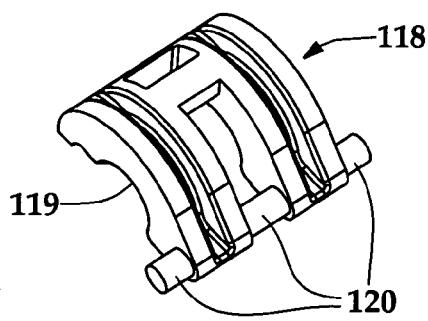
FIG. 10 is a perspective view of the latch member of FIG. 9, rotated approximately 180°.
Figure 11:
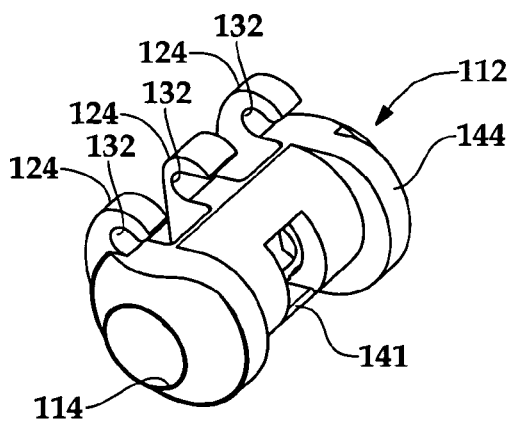
FIG. 11 is a perspective view of a sleeve member of the fastener of FIG. 6.
Figure 12:
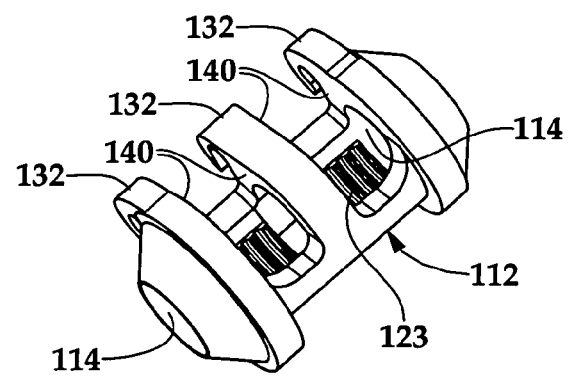
FIG. 12 is a perspective view of the sleeve member of FIG. 11, rotated approximately 180°.

As best viewed in FIGS. 8 and 9, the surfaces 119 have ridges 121, which engage the threads of the bolt 116 when the latch member 118 is in the first position, with the bearing surfaces 119 in engagement with the bolt 116. Similarly, as best viewed in FIG. 12, a portion of the interior surface 114 also has ridges 123, which also engage the threads of the bolt 116 when the latch member 118 is in the first position, with the bearing surfaces 119 in engagement with the bolt 116.

Also, when the contact surfaces 119 are pressed into engagement with the bolt 116, the diametrically opposed surface 114 of the sleeve 112 will be drawn inwardly into contact with the opposite surface of the bolt 116, such that the ridges 123 engage the threads of the bolt 116. This will further facilitate a locking engagement of the fastener 110 of the invention with the bolt 116. It will be appreciated that appropriate manipulation of the latch or latch member 118 will result in the desired pressing of the contact surface 119 against the bolt to achieve this locking engagement.

In the illustrated embodiment, a hinge or pivot arrangement, including a set of spaced apart pivot pins 120, extending through a set of aligned, and similarly spaced apart bearing surfaces 132, in the sleeve, respectively, mount the latch member for pivotal movement between the two above-described positions. The bearing surfaces 132 are formed in respective protruding portions 124 of the sleeve 112. The latch member 118 also has an outwardly extending gripping surface 136, which may be formed with a camming releasable latching nose or other grip facilitating feature 138. A complementary surface 141 is provided on the sleeve 112 for releasably latching with the camming releasable latching nose 138. Other arrangements may also be used for pivotally mounting the latch 118 member for the above-described movement with respect to the sleeve member 112, without departing from the invention.

In order to permit the engagement of the surfaces 119 of the latch member with the fastener 116, through openings 140 are provided in appropriate portions of the sleeve 112. This openings 140 are such that the surface 119 of the latch member may extend through the sleeve 112 for engagement with the bolt 116.

In the illustrated embodiment an additional bearing surface 142 is provided, for example by an enlarged or increased diameter rim portion 144 on one end of the sleeve 112. This enlarged diameter bearing surface 142 may bear against an undersurface of the toilet bowl or other fixture from which the nut 116 projects, in order to securely engage the same, when the latch 118 is in secure locking engagement with the bolt 116.

What has been shown and described is a novel and improved quick release fastener, which may be used for releasably engaging a cylindrical object such as a bolt body. In one particularly useful and embodiment, the fastener of the invention may be utilized for releasably securing a toilet seat to a toilet bowl fixture.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A quick release fastener for releasably engaging a bolt body threaded portion, said releasable fastener comprising:

a generally cylindrical sleeve member having a substantially cylindrical opening extending through said cylindrical sleeve and defining a first axis and defining a generally cylindrical wall for closely surrounding said bolt body about 360 degrees, said sleeve member wall having a generally cylindrical inner surface closely spaced from an outer surface of said bolt body, a generally cylindrical outer surface and at least one through opening extending from said inner surface to said outer surface;

whereby said quick release fastener is moved into surrounding relation with said bolt body by translating said quick release fastener generally along said first axis; and a generally arcuate latch member having an inner wall surface having at least one bolt contact surface and a manually engageable surface, said contact surface comprising a concave surface for circumferential engagement with an outer surface of said bolt body threaded portion;

said latch member being hingedly mounted on said sleeve member for rotational movement about a second axis substantially parallel to said first axis in response to manipulation of said manually engageable surface between a first position wherein said at least one bolt contact surface of said latch member extends through said at least one through opening and is in frictional engagement with said bolt body and draws an opposed portion of said inner surface of said sleeve member into frictional engagement with said bolt body, and a second position wherein said contact surface is not in engagement with said bolt body, so as to release said inner surface of said sleeve member from frictional engagement with said bolt body and thereby release said quick release fastener from engagement with said bolt;

said concave contact surface being located relative to said hingedly mounted latch member so that in said secured position, said concave surface defines an axis substantially parallel to said first axis;

wherein said latch member has a pair of axially spaced contact surfaces, each comprising a concave surface for circumferential engagement with an outer surface of said bolt body threaded portion;

and wherein said sleeve member has a pair of axially spaced through openings through which said contact surfaces of said latch member extend for engagement with said bolt body, whereby said contact surfaces extend internally of said inner surface of said sleeve when in said first position.

2. The fastener of claim 1, wherein said rotational movement is achieved by a set of aligned bores fonned respectively in said latch member and said sleeve member and a pivot pin extending through said bores.

3. The fastener of claim 1, wherein said sleeve member has an enlarged outer diameter at one end thereof.

4. The fastener of claim 1 wherein said rotational movement is achieved by aligned sets of pins and bearings formed respectively on said latch member and said sleeve member.

5. The fastener of claim 1, wherein each of said latch member and said sleeve member comprises a one-piece, integrally molded plastic member.

6. The fastener of claim 1, wherein each said at least one bolt contact surface has a plurality of teeth for engaging said bolt body.

7. The fastener of claim 6, wherein said contact surface teeth are configured for engaging a plurality of threads of said bolt body.

8. The fastener of claim 1. wherein said sleeve member inner surface has a plurality of teeth for engaging said bolt body.

9. The fastener of claim 8, wherein said inner surface teeth are configured for engaging a plurality of threads of said bolt body.

10. The fastener of claim 1, wherein said manually engageable surface is located generally diametrically opposite said second axis.

11. The fastener of claim 10, wherein said manually engageable surface has a releasable latching portion generally diametrically opposite said second axis for releasably engaging the sleeve.

* * * * *